G. W. CISSEL AND J. P. APPLEMAN.
AUTOMOBILE WINDSHIELD SCREEN.
APPLICATION FILED JULY 29, 1919.
1,345,585.
Patented July 6, 1920.
2 SHEETS—SHEET 1.
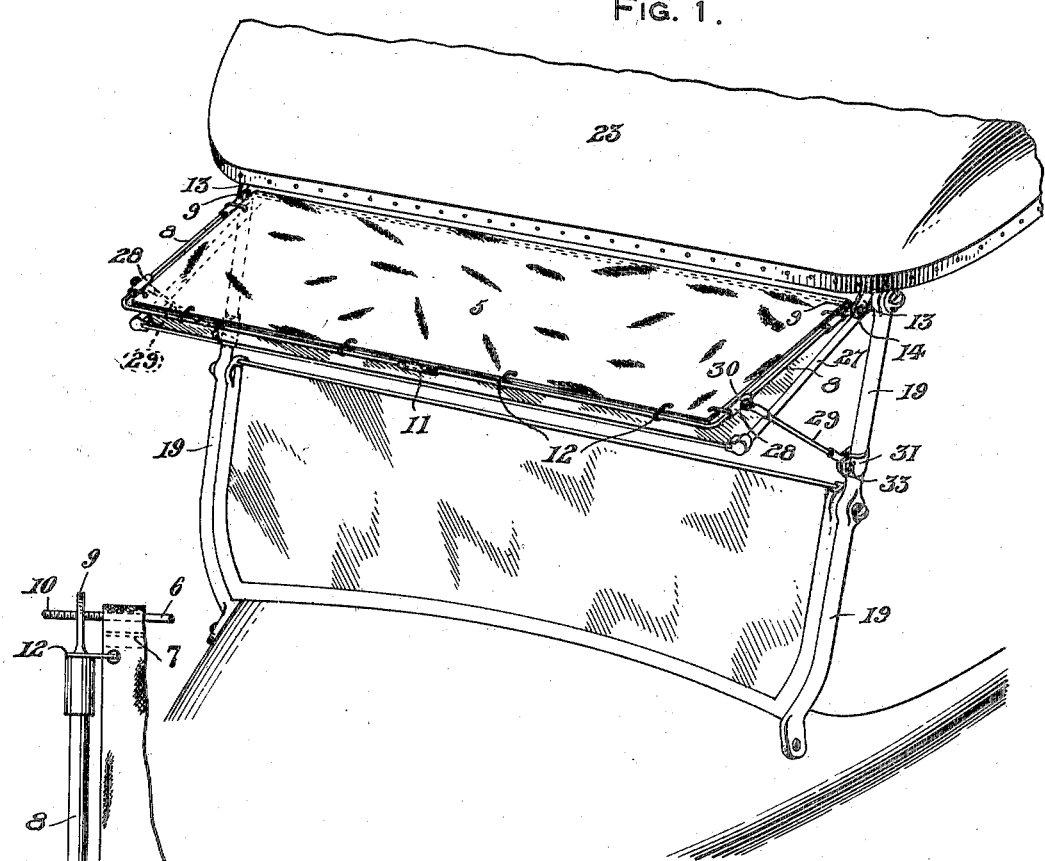
FIG. 1.
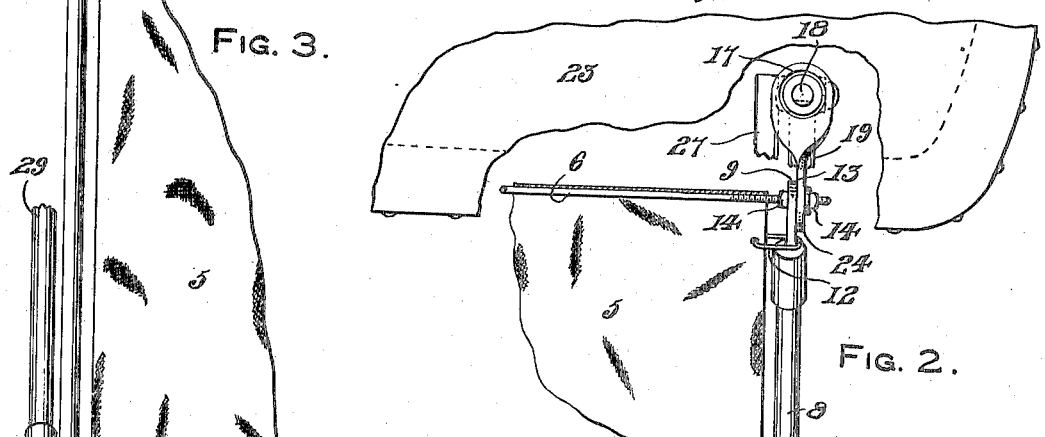
FIG. 3.
FIG. 2.
Inventors
G. W. Cissel
J. P. Appleman
By N. M. Wilson
Attorney G. W. CISSEL AND J. P. APPLEMAN.
AUTOMOBILE WINDSHIELD SCREEN.
APPLICATION FILED JULY 29, 1919.
1,345,585.
Patented July 6, 1920.
2 SHEETS—SHEET 2.
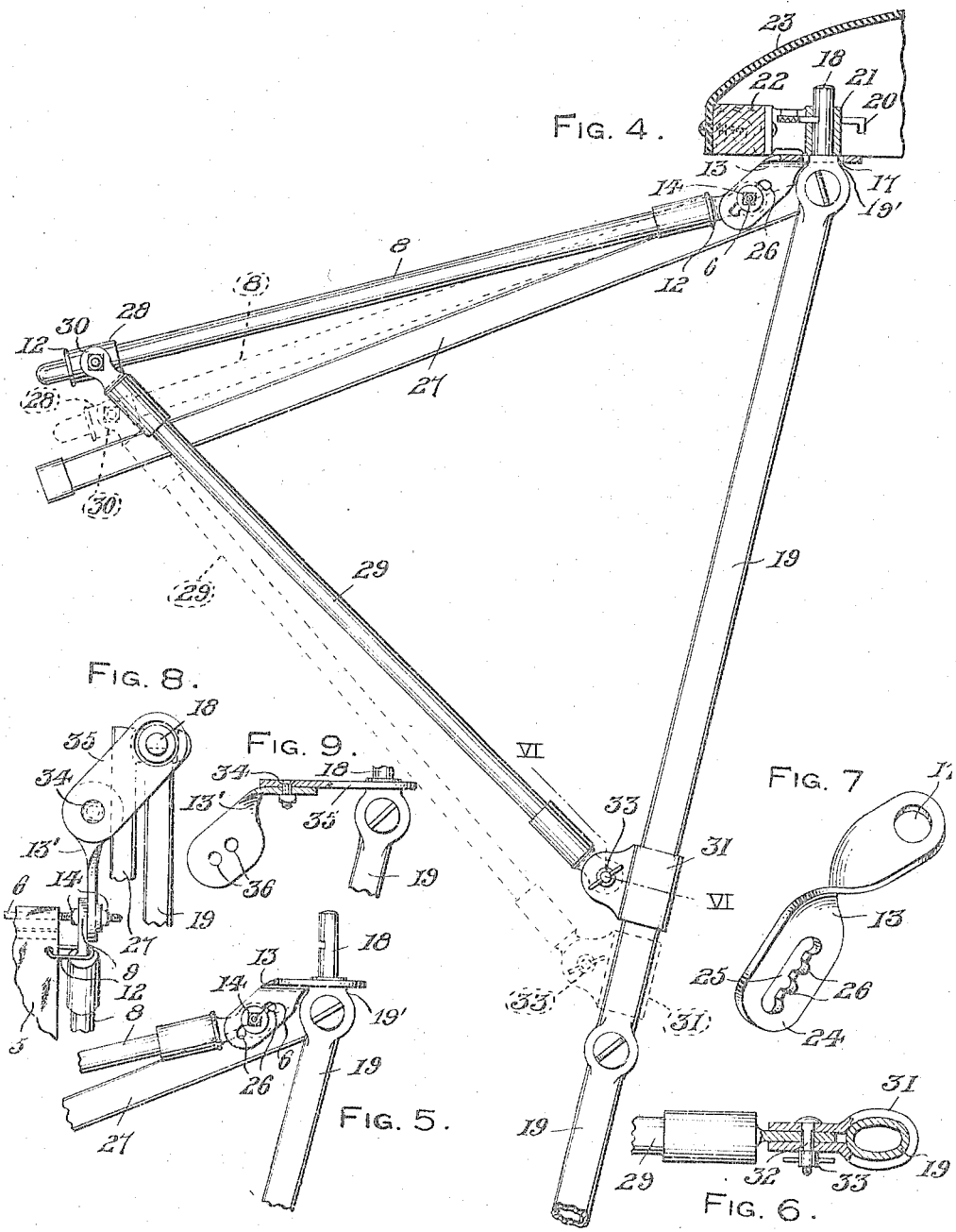
Inventors
G. W. Cissel
J. P. Appleman
By 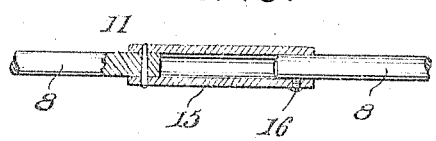
Attorney

UNITED STATES PATENT OFFICE.

GEORGE WM. CISSEL AND JOHN P. APPLEMAN, OF WASHINGTON, DISTRICT OF COLUMBIA.

AUTOMOBILE-WINDSHIELD SCREEN.

1,345,585. Specification of Letters Patent. Patented July 6, 1920.

Application filed July 29, 1919. Serial No. 314,133.

*To all whom it may concern:*

Be it known that we, (1) GEORGE W. CISSEL and (2) JOHN P. APPLEMAN, citizens of the United States of America, residing at Washington, in the District of Columbia, have invented certain new and useful Improvements in Automobile-Windshield Screens, of which the following is a specification.

Our invention relates to certain new and useful improvements in shades or screens, particularly applicable for the wind shields of automobiles, the principal object of the invention being to provide a relatively simple and cheap but practical device which can be easily and quickly attached to the wind shield and adjusted to cut off or shade from the eyes of the chauffeur, as desired, the direct rays from the sun which would otherwise strike the upper section of the wind shield and cause harmful glare. The device is likewise effective at night for shading the driver's eyes from the glare of street lamps and of headlights carried by approaching vehicles. The device may further be used to advantage to prevent the accumulation of rain and snow upon the glass of a wind shield.

With the above general objects in view, and others that will become apparent as the nature of the invention is better understood, the same consists in the novel form, combination and arrangement of parts hereinafter more fully described, shown in the accompanying drawings and claimed.

In the accompanying drawings,

Figure 1 is a perspective view of a portion of an automobile showing the screen applied, Fig. 2 is an enlarged top plan view of a portion of Fig. 1, partly broken away and partly in section to illustrate details, Fig. 3 is a top plan view of an end portion of the screen, parts being removed and in section, Fig. 4 is an end view of a wind shield with the screen applied, the mounting bracket and the automobile top being shown partially in section, Fig. 5 is a fragmentary view showing the connection of the mounting bracket with the wind shield, Fig. 6 is a detail view, partially in section, and taken substantially upon line VI—VI of Fig. 4, Fig. 7 is an enlarged perspective view of the mounting bracket for the screen, Fig. 8 is a fragmentary detail view in top plan and showing a modified form of mounting bracket, Fig. 9 is a view in elevation and partially in section of the modified form of mounting bracket shown applied to a wind shield member which is partly broken away, and Fig. 10 is a fragmentary view, partly in section, illustrating the adjustable connection between the adjacent ends of the screen frame members.

As illustrated in the accompanying drawings, the screen includes a strip 5 of canvas or other suitable material having its rear end folded around the frame bar 6 and there retained by means of stitching 7 or the like. A pair of substantially L-shaped frame bars 8 are provided with eyes 9 at their free ends through which the threaded ends 10 of the bar 6 project, said frame bars 8 having their ends adjustably and detachably connected as at 11 at the central portion of the front edge of the strip 5. The frame bars 8 coöperate to form the front bar of the screen and each of the same forms an end bar of said frame.

The strip 5 is of a size to substantially fill the space bounded by the bars 6 and 8 and are attached to the latter bars in any suitable manner such as by lacing or providing rings 12 which embrace the rods and extend through the strip 5. The bars 8 and mounting brackets 13 are preferably clamped upon the rod 6 between the nuts 14 which are threaded upon the ends 10 of said rod 6.

The adjustable connection 11 is shown in detail in Fig. 10 wherein the sleeve 15 is rigidly fastened to one of the bars 8 and slidably receives the other one of the same, said rod being retained by the set screw 16 in adjusted positions. It will be apparent that by reason of the connection 11, an adjustment may be had to accommodate the device to windshields of various widths, it being only necessary that the strip 5 be replaced by a larger one if too small or vice versa.

As shown more clearly in Figs. 5 and 7 the mounting bracket 13 comprises a twisted strip of sheet metal with one end apertured as at 17 for reception of the bolt 18 which is provided upon the upper end of the upright wind shield bar 19 to be detachably retained by means of the latch 20 within the keeper 21 which is fastened to the bow 22 of the automobile top 23. The end of the bracket 13 which is apertured as at 17 assumes a horizontal position when operatively disposed on the bolt 18 as shown more clearly in Figs. 4 and 5, the other end portion 24 of said bracket being directed at a downward inclination and provided with a longitudinal slot 25, one wall of which is provided with a plurality of notches 26 within any one of which may be positioned the threaded end 10 of the frame bar 6. It is to be understood that a bracket 13 is provided at each upright bar 19 of the wind shield and by positioning the ends of the bar 6 in the proper one of the notches 26, the screen may be arranged with its rear edge the required distance forwardly or rearwardly of the front edge of the automobile top.

In order to support the forward portion of the screen and to hold the screen at the proper angle relative to the upper hinged wind shield section 27, we slidably arrange a sleeve 28 upon each of the bars 8 at the ends of the screen frame and pivotally connect one end of a link 29 thereto as at 30, said link having its other end flattened and apertured so as to be received between the legs of the clamp 31 as shown in Fig. 6, a bolt 32 being passed through said legs and the adjacent end of the link 29 and having a nut 33 threaded thereon to bind the parts against relative movement and to hold the clamp in any adjustable position upon the upright wind shield member or bar 19. The wind shield bars 19 are enlarged as at 19' at the bases of the bolts 18 where the wind shield section 27 is hinged to said bars, and the mounting brackets are slid onto the bolts 18 so as to rest upon said enlargements beneath the keepers 21.

If the screen is slightly smaller than the required size, the same may be utilized by the provision of the modified form of mounting bracket 13' shown in Figs. 8 and 9. This mounting bracket is formed in two parts which are pivotally connected as at 34, one part 35 being apertured for reception of the bolt 18 and the other being provided with a number of apertures 36 for selective reception of the threaded ends of the frame bar 6. By this construction the member 35 of the mounting bracket 13' may be disposed at an angle to the other member of said mounting bracket and at an angle to the longitudinal axis of the automobile so as to utilize a smaller size screen and insure the proper position of the apertures 36 for reception of the ends 10 of the rods 6, From the foregoing description it will be seen that the screen may be tilted to any desired angle and secured, and the operator of the machine may observe the road in advance of the machine by looking under the forward edge of the screen.

It is believed that the construction and operation of the present device will be readily understood by those skilled in the art from the foregoing description.

While the embodiments of the invention herein shown and described are what are believed to be the preferable ones, it is nevertheless to be understood that minor changes may be made in the form, combination and arrangement of parts without departing from the spirit and scope of the invention as claimed.

What we claim is:

1. The combination with the upright bolts of the detachable connection between an automobile wind shield and the forward end of the automobile top, of a screen extending forwardly and downwardly from the forward end of the top, and mounting brackets for said screen resting on said bolts, said mounting brackets including a section mounted for horizontal swinging movement on the bolt and a second section connected to the screen and pivotally connected to the first named section for horizontal movement relative thereto.

2. The combination with the upright bolts of the detachable connection between an automobile wind shield and top, of a screen extending forwardly from the wind shield, and mounting brackets for said screen mounted on said bolts, said mounting brackets including horizontal portions provided with apertures through which the bolts project and inclined portions twisted at right angles to the first named portions and detachably connected to the screen.

3. A screen for automobile wind shields comprising a rear bar having threaded ends, a pair of L-shaped bars having adjacent ends adjustably connected and provided with apertured free ends through which the threaded ends of the rear bar project, mounting brackets upon said threaded ends of the rear bar, nuts upon said rear bar between which said mounting brackets and L-shaped bars are retained, and means associated with the forward portion of the screen and adapted for adjustable connection with the upright bars of a wind shield to retain the screen in adjusted angular positions.

4. A screen for automobile wind shields comprising a rear bar having threaded ends, a pair of L-shaped bars having adjacent ends adjustably connected and provided with apertured free ends through which the threaded ends of the rear bar project, mounting brackets upon said threaded ends of the rear bar, nuts upon said rear bar between which said mounting brackets and L-shaped bars are retained, and means associated with the forward portion of the screen and adapted for adjustable connection with the upright bars of a wind shield to retain the screen in adjusted angular positions, said last named means including a link pivotally associated with the L-shaped bars.

5. A screen for automobile wind shields comprising a rear bar having threaded ends, a pair of L-shaped bars having adjacent ends adjustably connected and provided with apertured free ends through which the threaded ends of the rear bar project, mounting brackets upon said threaded ends of the rear bar, nuts upon said rear bar between which said mounting brackets and L-shaped bars are retained, and means associated with the forward portion of the screen and adapted for adjustable connection with the upright bars of a wind shield to retain the screen in adjusted angular positions, said last named means including a link pivotally and slidably associated with the L-shaped bars.

6. The combination with the upright bars of a wind shield having bolts upon their upper ends and provided with enlargements at the bases of said bolts, a top having keepers at its forward end in which said bolts are adapted to be retained, of mounting brackets having apertures through which said bolts are disposed, said mounting brackets resting on said enlargements, a screen extending forwardly and downwardly from the forward end of said top and carried by said mounting brackets, said screen being pivoted to said mounting brackets for vertical movement, and means associated with the forward portion of the screen and with said upright windshield bars for supporting the screen adjustably at various inclinations.

7. The combination with the upright bars of a windshield having bolts upon their upper ends and provided with enlargements at the bases of said bolts, and a top having keepers at its forward end in which said bolts are adapted to be retained, of mounting brackets resting on said enlargements and having apertures through which said bolts are disposed, said keepers substantially resting on said brackets when said bolts are disposed in said keepers and the top is up, and a screen extending forwardly and downwardly from the forward end of said top and carried by said mounting brackets.

8. The combination with the upright bars of a windshield having bolts upon their upper ends and provided with enlargements at the bases of said bolts, and a top having keepers at its forward end in which said bolts are adapted to be retained, of mounting brackets resting on said enlargements and having apertures through which said bolts are disposed, said keepers substantially resting on said brackets when said bolts are disposed in said keepers and the top is up, a screen extending forwardly and downwardly from the forward end of said top and carried by said mounting brackets, said screen being pivoted to said mounting brackets for vertical movement, and means to retain said screen at various inclinations.

9. The combination with the upright bars of a windshield having bolts upon their upper ends and provided with enlargements at the bases of said bolts, and a top having keepers at its forward end in which said bolts are adapted to be retained, of mounting brackets resting on said enlargements and having apertures through which said bolts are disposed, said keepers substantially resting on said brackets when said bolts are disposed in said keepers and the top is up, a screen extending forwardly and downwardly from the forward end of said top and carried by said mounting brackets, said screen being pivoted to said mounting brackets at a point below the portions of the same which rest upon said enlargements, and means to swing said screen vertically to various inclinations.

10. The combination with the upright bars of a windshield having bolts upon their upper ends and provided with enlargements at the bases of said bolts, and a top having keepers at its forward end in which said bolts are adapted to be retained, of mounting brackets having flat horizontal portions which rest on said enlargements and which have apertures through which said bolts are disposed, said mounting brackets further including forwardly and downwardly extending portions, and a screen extending forwardly and downwardly from the forward end of said stop and carried by the last named portions of said mounting brackets.

In testimony whereof we affix our signatures.

GEORGE WM. CISSEL.
JOHN P. APPLEMAN.